United States Patent
Chen et al.

(10) Patent No.: US 9,588,843 B2
(45) Date of Patent: Mar. 7, 2017

(54) SYSTEM AND METHOD FOR TRANSFERRING TRADITIONAL RAID TO DISTRIBUTED ARRAY

(71) Applicant: International Business Machines Corporation, Armonk, NY (US)

(72) Inventors: Chiahong Chen, Oro Valley, AZ (US); Bo Cheng, Shanghai (CN); Xue Dong Gao, Shanghai (CN); David R. Kahler, Tucson, AZ (US); Hai Bo Qian, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 14/331,163

(22) Filed: Jul. 14, 2014

(65) Prior Publication Data

US 2016/0011943 A1 Jan. 14, 2016

(51) Int. Cl.
*G06F 12/00* (2006.01)
*G06F 11/10* (2006.01)
*G06F 3/06* (2006.01)

(52) U.S. Cl.
CPC .......... *G06F 11/1092* (2013.01); *G06F 3/067* (2013.01); *G06F 3/0619* (2013.01); *G06F 3/0665* (2013.01); *G06F 3/0689* (2013.01)

(58) Field of Classification Search
CPC G06F 11/1088–11/1096; G06F 3/0647; G06F 11/1092; G06F 2211/1028
See application file for complete search history.

(56) References Cited

U.S. PATENT DOCUMENTS

| | | | | |
|---|---|---|---|---|
| 5,960,169 | A * | 9/1999 | Styczinski | G06F 11/1076 711/114 |
| 7,877,545 | B2 * | 1/2011 | Sharma | G06F 3/0617 711/114 |
| 8,015,440 | B2 | 9/2011 | Flynn et al. | |
| 8,032,782 | B2 | 10/2011 | He et al. | |
| 8,239,624 | B2 | 8/2012 | Galloway et al. | |
| 8,732,485 | B2 * | 5/2014 | Kahler | G06F 11/1076 380/277 |
| 2014/0068211 | A1 | 3/2014 | Fiske et al. | |

\* cited by examiner

*Primary Examiner* — Reginald Bragdon
*Assistant Examiner* — Hannah A Faye-Joyner
(74) *Attorney, Agent, or Firm* — Zilka-Kotab, PC

(57) ABSTRACT

In one embodiment, a method includes iteratively selecting an original, unmoved stride from an original array until all original strides have been moved, determining a target stride location in a distributed array, determining a state of the target stride from the following states: an old state indicating unmoved data, a blank state indicating no data, and a new state indicating migrated data, determining that all target stripes are blank, moving data from the original stride to the target stripes when all the target stripes are blank, delaying the moving of the data from the original stride to the target stripes in the target stride when any of the target stripes of the target stride are in the old state and waiting until all the target stripes of the target stride are in the blank state, and determining that all original strides from the original array have been moved.

20 Claims, 6 Drawing Sheets

SYSTEM AND METHOD FOR TRANSFERRING TRADITIONAL RAID TO DISTRIBUTED ARRAY

BACKGROUND

The present invention relates to using distributed redundant array of independent disks (RAID), and more specifically this invention relates to transferring data from a traditional RAID structure to a distributed RAID structure.

An amount of time for a traditional RAID array rebuild to complete will never be better than drive capacity and/or drive bandwidth available in the traditional RAID. Consequently, traditional RAID array rebuild times are increasing quickly, with 3 TB nearline drives having a rebuild time in the range from about 10 hours to about 20 hours or more. The mean time between failure (MTBF) rates for RAID are decreasing because RAID are exposed to data loss due to medium errors or a second drive failure during the rebuilding process. Many users, especially users with a large number of arrays now consider RAID-5 to provide inadequate protection against data loss.

Therefore, should a RAID user want to use distributed RAID in an existing system, then data migration must be performed which needs more time and brings more risk of failure or data loss to the whole system.

BRIEF SUMMARY

In one embodiment, a computer program product for migrating data to a distributed array includes a computer readable storage medium having program instructions embodied therewith, the program instructions readable and/or executable by a processor to cause the processor to iteratively select, by the processor, an original, unmoved stride from an original array until all original strides have been moved, determine, by the processor, a target stride location in a distributed array, determine, by the processor, a state of the target stride, the state being chosen from: an old state indicating unmoved data is stored therein, a blank state indicating no data is stored therein, and a new state indicating that migrated data is stored therein, determine, by the processor, whether all target stripes of the target stride are in the blank state, move, by the processor, data from the original stride to the target stripes in the target stride when all the target stripes of the target stride are in the blank state, delay, by the processor, the moving of the data from the original stride to the target stripes in the target stride when any of the target stripes of the target stride are in the old state and waiting until all the target stripes of the target stride are in the blank state, and determine, by the processor, that all original strides from the original array have been moved.

In another embodiment, a system includes a processor and logic integrated with and/or executable by the processor, the logic being configured to iteratively select an original, unmoved stride from an original array until all original strides have been moved, determine a target stride location in a distributed array, determine a state of the target stride, the state being chosen from: an old state indicating unmoved data is stored therein, a blank state indicating no data is stored therein, and a new state indicating that migrated data is stored therein, determine whether all target stripes of the target stride are in the blank state, move data from the original stride to the target stripes in the target stride when all the target stripes of the target stride are in the blank state, delay the moving of the data from the original stride to the target stripes in the target stride when any of the target stripes of the target stride are in the old state and waiting until all the target stripes of the target stride are in the blank state, and determine that all original strides from the original array have been moved.

In yet another embodiment, a method for migrating data to a distributed array includes iteratively selecting an original, unmoved stride from an original array until all original strides have been moved, determining a target stride location in a distributed array, determining a state of the target stride, the state being chosen from: an old state indicating unmoved data is stored therein, a blank state indicating no data is stored therein, and a new state indicating that migrated data is stored therein, determining whether all target stripes of the target stride are in the blank state, moving data from the original stride to the target stripes in the target stride when all the target stripes of the target stride are in the blank state, delaying the moving of the data from the original stride to the target stripes in the target stride when any of the target stripes of the target stride are in the old state and waiting until all the target stripes of the target stride are in the blank state, and determining that all original strides from the original array have been moved.

Other aspects and embodiments of the present invention will become apparent from the following detailed description, which, when taken in conjunction with the drawings, illustrate by way of example the principles of the invention.

DETAILED DESCRIPTION

Figure 1:
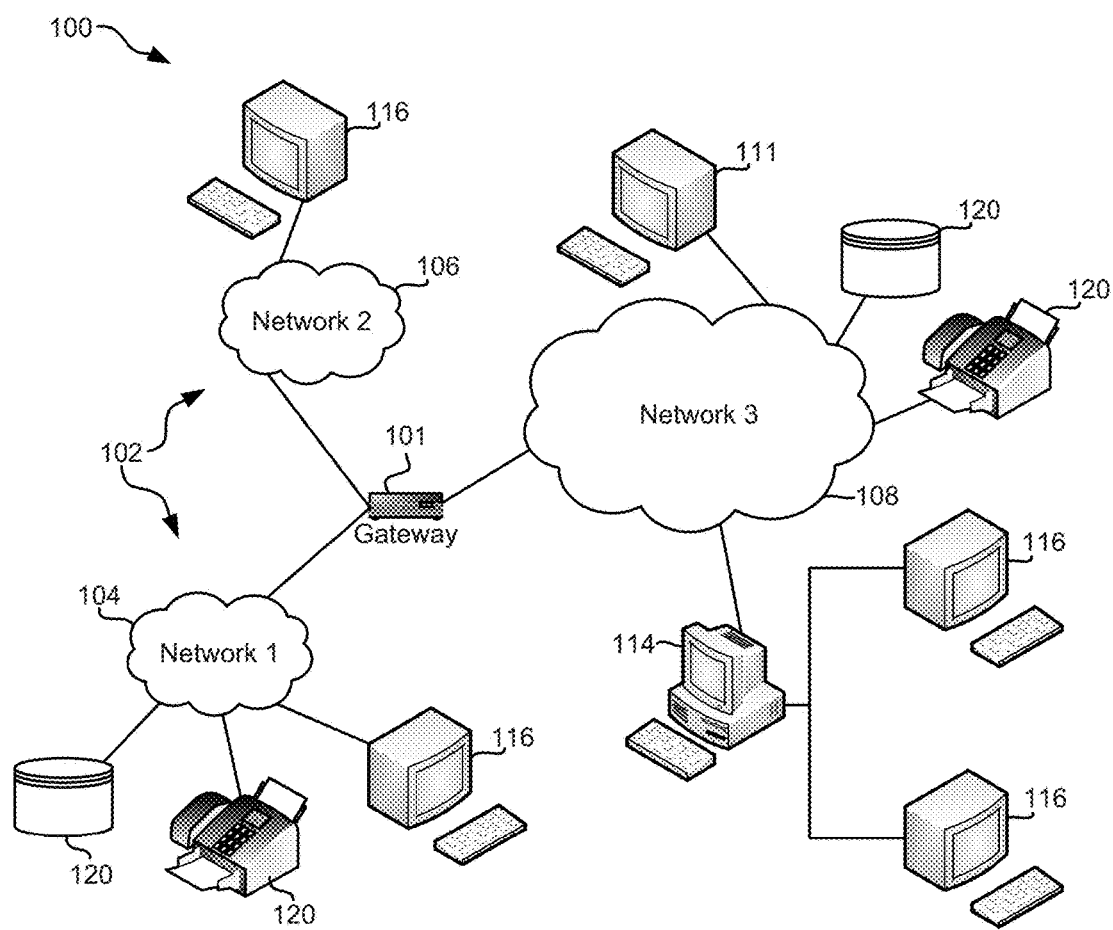
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for migrating data from a traditional array of data to a distributed array of data. In various approaches, the arrays of data may be referred to as redundant arrays of independent disks (RAIDs).

In one general embodiment, a computer program product for migrating data to a distributed array includes a computer readable storage medium having program instructions embodied therewith, the program instructions readable and/or executable by a processor to cause the processor to iteratively select, by the processor, an original, unmoved stride from an original array until all original strides have been moved, determine, by the processor, a target stride location in a distributed array, determine, by the processor, a state of the target stride, the state being chosen from: an old state indicating unmoved data is stored therein, a blank state indicating no data is stored therein, and a new state indicating that migrated data is stored therein, determine, by the processor, whether all target stripes of the target stride are in the blank state, move, by the processor, data from the original stride to the target stripes in the target stride when all the target stripes of the target stride are in the blank state, delay, by the processor, the moving of the data from the original stride to the target stripes in the target stride when any of the target stripes of the target stride are in the old state and waiting until all the target stripes of the target stride are in the blank state, and determine, by the processor, that all original strides from the original array have been moved.

In another general embodiment, a system includes a processor and logic integrated with and/or executable by the processor, the logic being configured to iteratively select an original, unmoved stride from an original array until all original strides have been moved, determine a target stride location in a distributed array, determine a state of the target stride, the state being chosen from: an old state indicating unmoved data is stored therein, a blank state indicating no data is stored therein, and a new state indicating that migrated data is stored therein, determine whether all target stripes of the target stride are in the blank state, move data from the original stride to the target stripes in the target stride when all the target stripes of the target stride are in the blank state, delay the moving of the data from the original stride to the target stripes in the target stride when any of the target stripes of the target stride are in the old state and waiting until all the target stripes of the target stride are in the blank state, and determine that all original strides from the original array have been moved.

In yet another general embodiment, a method for migrating data to a distributed array includes iteratively selecting an original, unmoved stride from an original array until all original strides have been moved, determining a target stride location in a distributed array, determining a state of the target stride, the state being chosen from: an old state indicating unmoved data is stored therein, a blank state indicating no data is stored therein, and a new state indicating that migrated data is stored therein, determining whether all target stripes of the target stride are in the blank state, moving data from the original stride to the target stripes in the target stride when all the target stripes of the target stride are in the blank state, delaying the moving of the data from the original stride to the target stripes in the target stride when any of the target stripes of the target stride are in the old state and waiting until all the target stripes of the target stride are in the blank state, and determining that all original strides from the original array have been moved.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
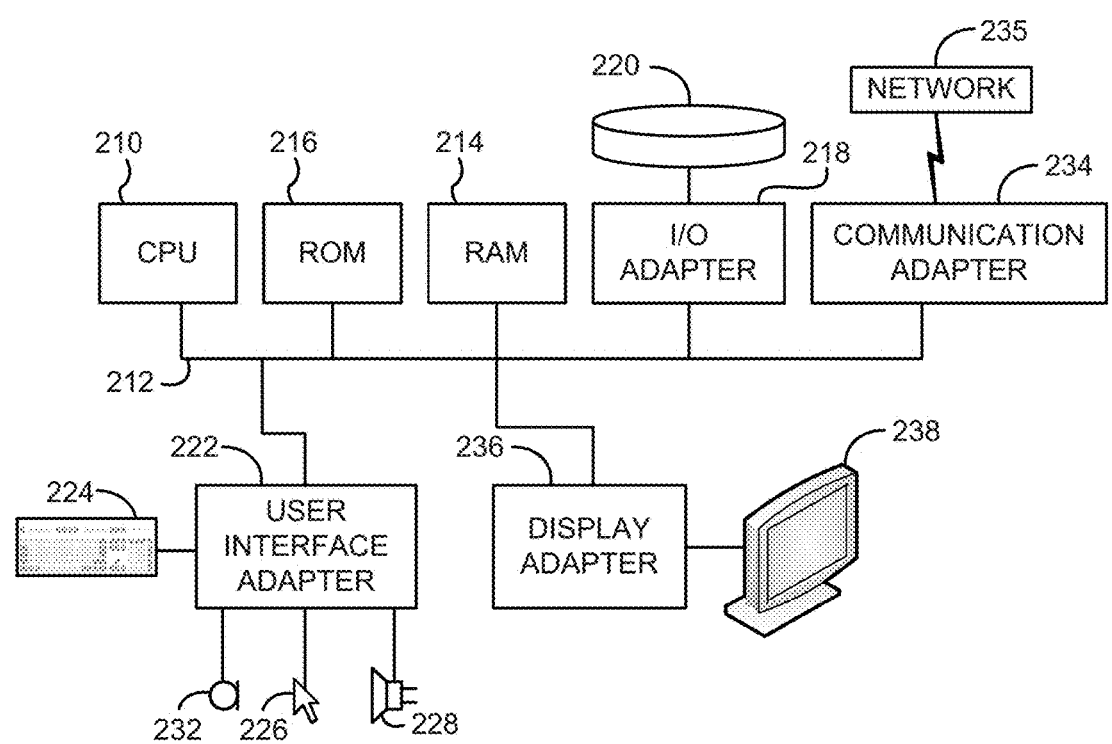
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
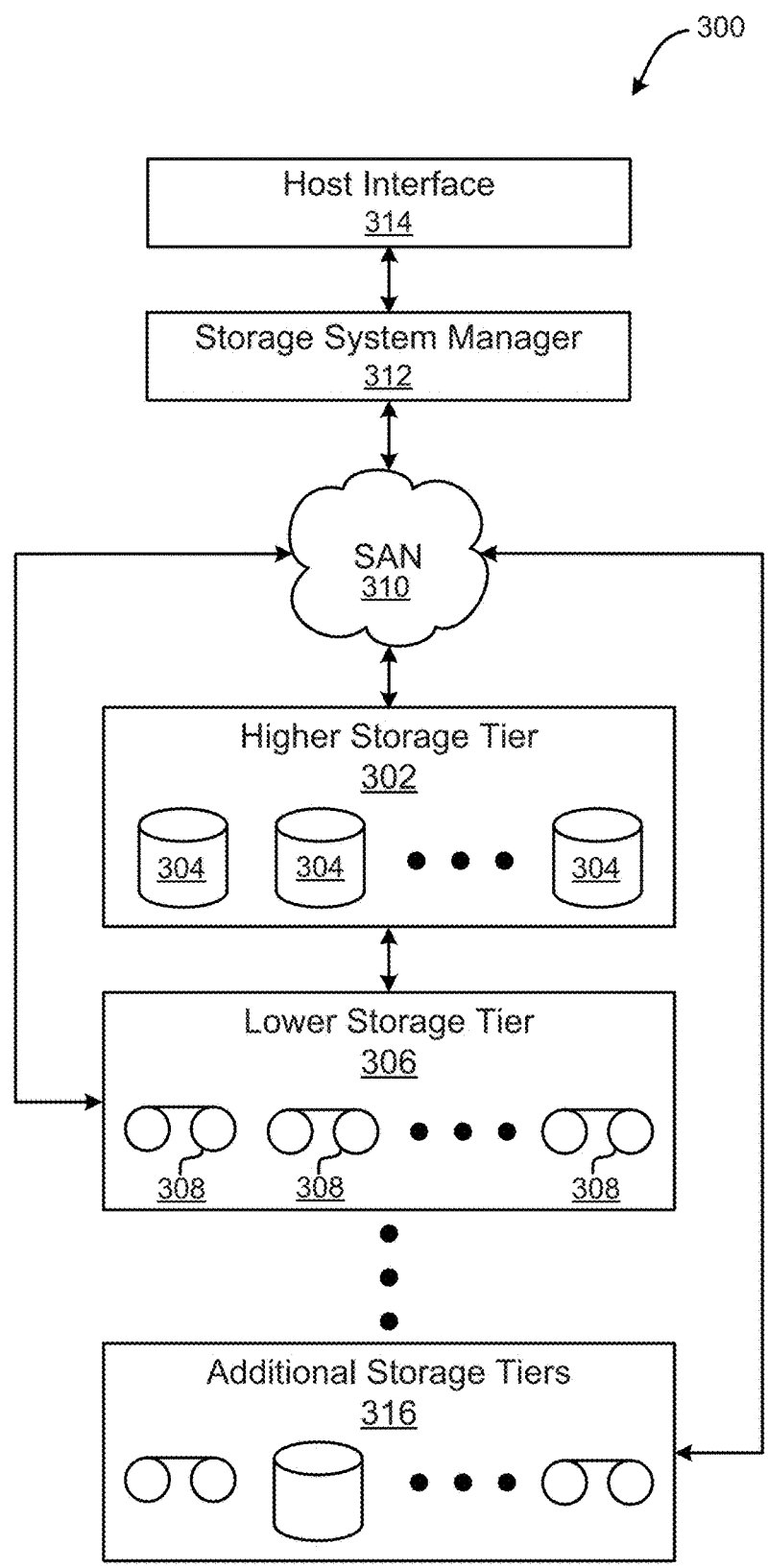
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

To transform a traditional array of data (and in some embodiments, a RAID such as RAID-5, RAID-10, etc.) to a distributed array of data (in some embodiments a RAID such as RAID-6, etc.), additional storage media (e.g., more HDDs) are added to complement the existing storage media used in the traditional array. The data is stored in the arrays according to stripes and strides. A stride of an array defines a quantity of bytes which must be traversed to get from one data element in the array to a successive (next or previous) data element in the array. The data element may be any number of bits, bytes, etc., but may not be larger than the size of the stride.

The stripe of the array defines how the successive data elements are placed across the multiple storage media used to store the array. According to techniques presented herein, the number of stripes and strides of the new distributed array may be calculated using the size of the original array and a mapping method.

In one embodiment, a mapping method, such as a function applied to each position in the original (traditional) array, e.g., F(ax,ay), may be used to map the stripe in the original array to a stripe in the distributed array. Also, a backward mapping method, such as a backward function applied to each position in the distributed array, e.g., F'(ax,ay), may be used to map the distributed array stripe to a stripe in the traditional array.

A two dimensional transition bitmap may be built for the strides to indicate the stride states: 1) original stride not moved out; 2) original stride moved out, new stride not moved in; and 4) original stride moved out, new stride moved in. Based on the transition bitmap, the system may use a background transform process to move the strides in the new distributed array. User I/O (read/write) and rebuild during the transform are possible based on the transition bitmap to ensure proper placement for data writing and/or reading.

According to one example, a traditional array may be migrated to a distributed array in the following manner. Assuming that the traditional array includes the following strides of information as shown in Table 1, these strides may be migrated to a distributed array.

TABLE 1

| Traditional Array | |
|---|---|
| 0. | 0000s |
| 1. | 1111s |
| 2. | 2222s |
| 3. | 3333s |
| 4. | 4444s |
| 5. | 5555s |
| 6. | 6666s |

To migrate this data over to a distributed array, any distribution algorithm may be used, with exemplary results of the migration being shown in Table 2.

TABLE 2

| Traditional Array | | | Distributed Array | |
|---|---|---|---|---|
| 0. | 0000s | | 0. | 0000333s |
| 1. | 1111s | | 1. | 111444s4 |
| 2. | 2222s | → | 2. | 22555s51 |
| 3. | 3333s | | 3. | 3666s622 |
| 4. | 4444s | | | |
| 5. | 5555s | | | |
| 6. | 6666s | | | |

Figure 4:
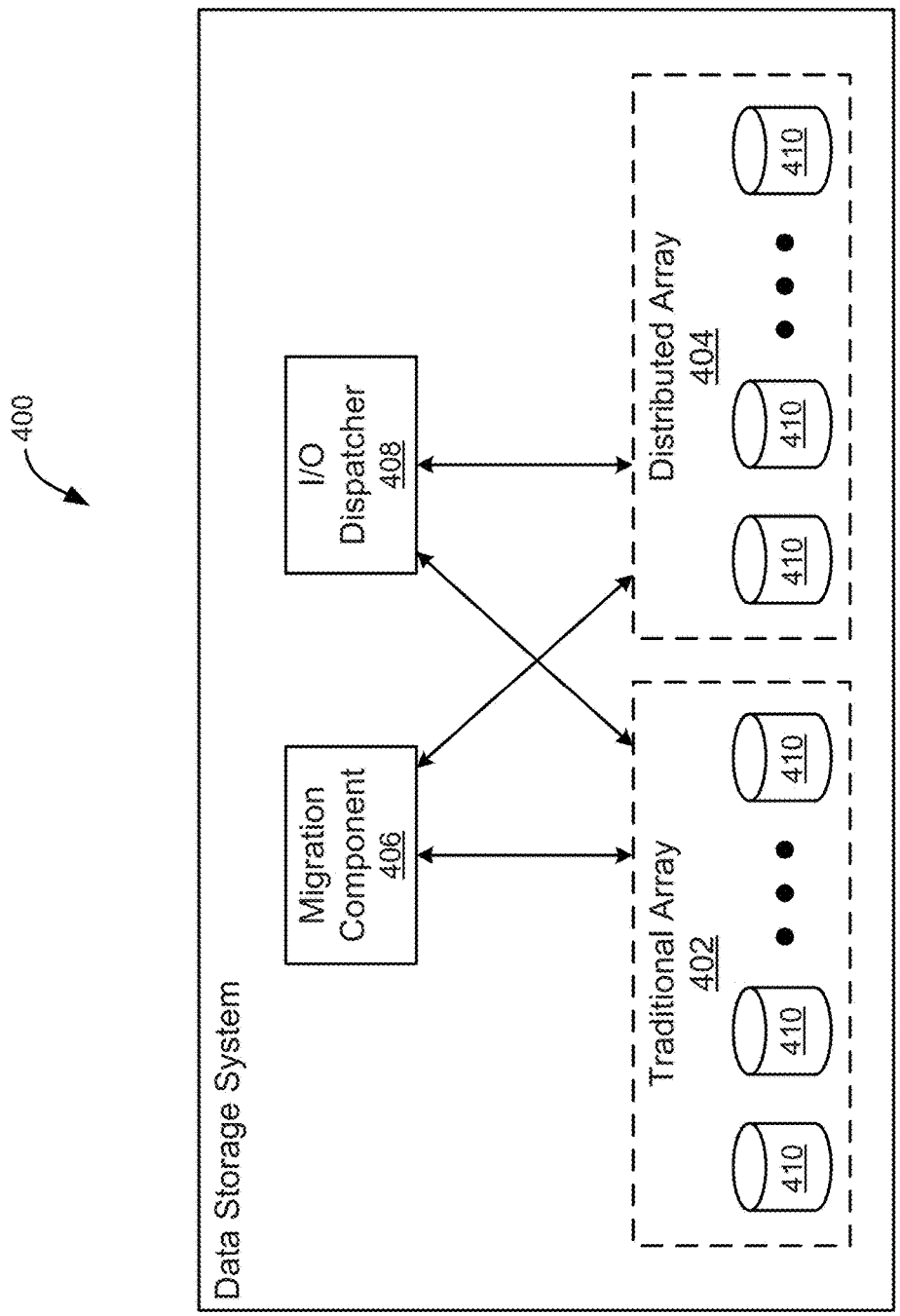
FIG. 4 shows a data storage system according to one embodiment.

In one embodiment, as shown in FIG. 4, a system 400 to migrate data from a traditional array 402 to a distributed array 404 may comprise a migration component 406 configured to move data from one storage medium 410 to another storage medium 410, and an I/O dispatcher 408 configured to send read and/or write requests (I/O) to an appropriate array (traditional array or distributed array) based on where the data currently resides when the I/O is received. The decisions of the I/O dispatcher 408 may be based on the transition bitmap that stores the current state of each stride of the various storage media being used in the arrays.

In one example, assume the following relationships:
ax=Array stripe within stride
ay=Array stride number
sx=Set stripe
sy=Set stride Any number of different distribution algorithms may be used, as would be known to one of skill in the art, and because of the differences between the distribution algorithms, the method to map the stripe in a traditional array to a distributed array will be different depending on the chosen distribution algorithm.

However, for each distribution algorithm, given the traditional array stripe and stride (ax and ay), the location of the set stripe and stride (sx and sy) in the distributed array may be found by using a forward lookup function, e.g., (sx,sy) =F(ax,ay). As the distributed array has more components then the traditional array, there will be free space for the stripes moving to the distributed array from the traditional array.

To move strides in a traditional array layout to a distributed array layout, a background process may be used to do the actual moving job, which may be executed by the migration component 406. For each stride ay, one bit may be used in the transition bitmap to indicate whether a corresponding stripe ax has been moved or has not been moved (e.g., 0 representing not moved and 1 representing moved, or vice versa). The transition bitmap may be stored to any available memory, such as a buffer, ROM, RAM, etc. This transition bitmap will store the states for all of the strides from the traditional array, even after all strides have been moved from their original locations in the traditional array. After the whole traditional stride ay is moved to one or more of the distributed array strides sy, the bitmap may be set, or the bitmap may be created incrementally after each migration of data elements from the traditional stride ay.

When M(ay) represents the bitmap value for any traditional stride ay, for each stripe, the bitmap value may serve two roles: 1) it represents the stripe in the traditional array (ax,ay), 2) it represents the stripe in the distributed array (s'x,s'y). Data of (ax,ay) will be moved to (sx,sy), and data of (s'x,s'y) is moved from (a'x,a'y) according to the embodiments described herein. Thus, during the migration/transformation process, each stride may be in one of four states, as shown in Table 3 below. Also, the state of a target stripe may be determined by the stride which contains the target stripe.

TABLE 3

| M(ay) | M(a'y) | State | State Name | Comments |
|---|---|---|---|---|
| 0 | 0 | Old data not moved out | OLD | To move data here, old data must be moved out first |
| 0 | 1 | Invalid State | INV | An error has occurred |
| 1 | 0 | Old data moved out, New data not moved in | BLANK | New data may be moved here |
| 1 | 1 | Old data moved out, New data moved in | NEW | Migration complete |

By tracking the state of each stride in the traditional array using the transition bitmap with the exemplary bit settings described in Table 3, it is possible to handle concurrent I/O during the migration/transformation process of converting a traditional array into a distributed array. Also, it is possible to recover data that may be lost during the migration/transformation process in another embodiment.

Figure 5:
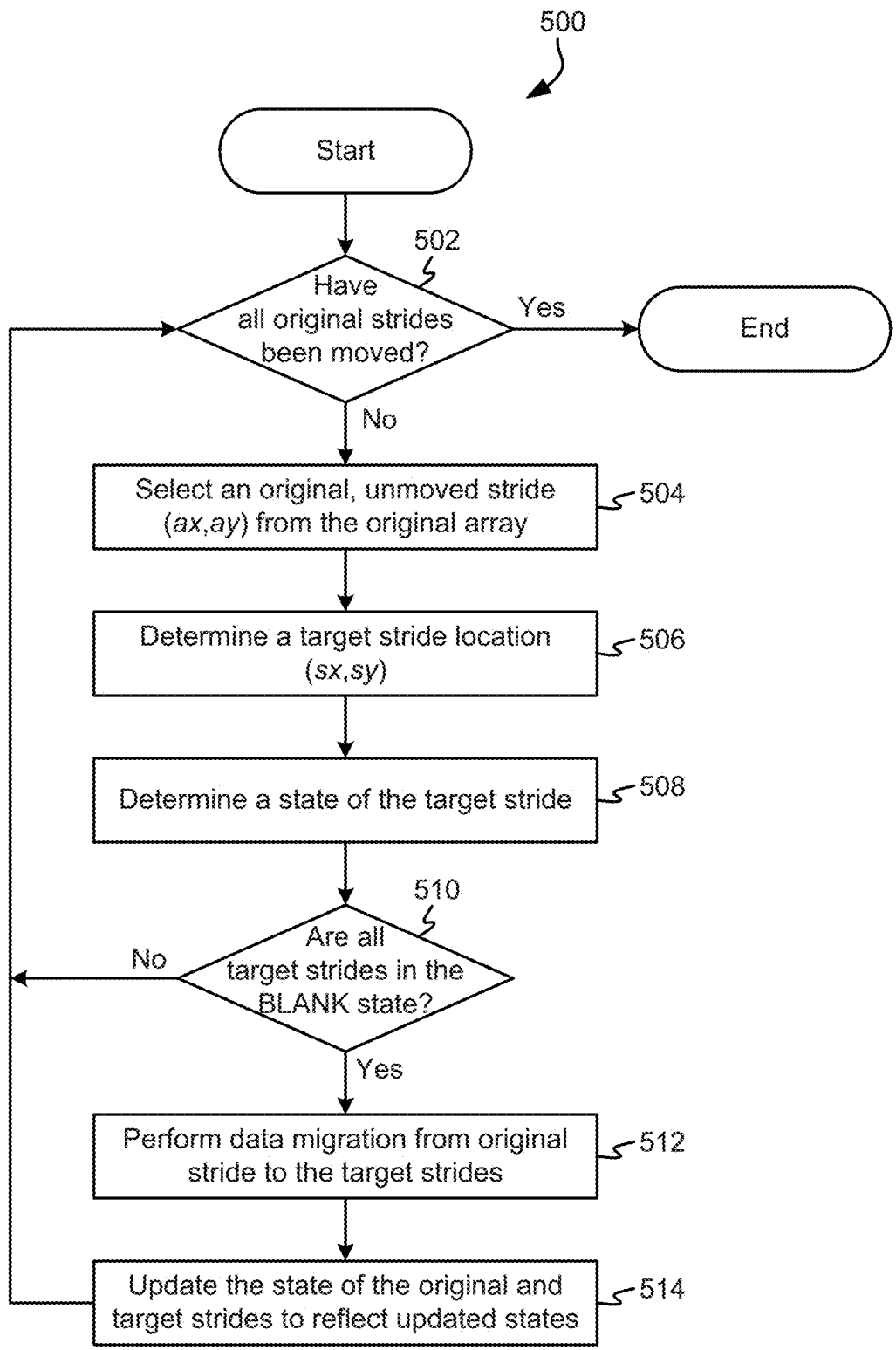
FIG. 5 shows a flowchart of a method according to one embodiment.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a storage controller, a migration component, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where it is determined whether all original strides from an original (traditional) array have been moved. When all original strides have been moved, method 500 ends; otherwise, method 500 continues to operation 504.

In one embodiment, the determination as to whether all original strides have been moved may be based on a transition bitmap which includes a state for each original stride in the original array, with each state indicating a possible data migration/transformation state for the individual stride, such as the states described in Table 3, in one embodiment.

In operation 504, an original, unmoved stride, e.g., (ax, ay), is selected from the original array. In one embodiment, the selection of the unmoved stride may be based on the transition bitmap, which may be used to indicate which strides from the original array have not yet been moved, and which have already been moved.

In operation 506, a target stride location, e.g., (sx,sy), is determined. The target stride is a stride in the new (distributed) array at location (sx,sy), which will store the data from the original stride in the original (traditional) array from location (ax,ay). This determination may be made using a distribution algorithm of a type known in the art, which may be represented by (sx,sy)=F(ax,ay).

In operation 508, a state of the target stride, e.g., OLD, BLANK, NEW, etc., is determined. Any number of states may be possible as understood by one of skill in the art, and the transition bitmap may be used to make this determination, in one embodiment.

In order to determine whether the original stride may be moved, it is determined whether the target stride is empty and ready to have the old data stored thereto (e.g., BLANK), or whether the target stride is currently storing some other data (such as data from another original stride not yet moved, e.g., OLD). When the target stride indicates that new data is already stored thereto (e.g., NEW), then the movement has already been completed. However, when a target stride indicates the NEW state when data is supposed to be moved there, this indicates a conflict. This may be caused by the bitmap not being updated after moving data, or for some other reason. To solve this problem, an original stride may be selected and moved to a new location temporarily, and the original stride may then be moved to its intended target location(s) once the target location(s) is in the BLANK state.

This determination may be based on the transition bitmap, in one embodiment, by determining a state of the target stride. Portions of each original stride may be moved to more than one target stride, since original striping typically does not line up to target striping. Therefore, each target stripe may be checked prior to moving a portion of the original stride thereto, in one embodiment. This may be accomplished by checking the state of the target stride in which each target stripe is included to determine the target stride's state, which is imputed onto the target stripe therein.

When any target stripe is in the OLD state, the movement of the original stride is delayed until the state of the target stripe is in the BLANK state.

In operation 510, it is determined whether all target stripes are in the BLANK state. When all target stripes for a particular original stride are in the BLANK state, the move is performed in operation 512, such as by using a migration component of a storage controller or some other suitable device or routine known in the art.

When all target stripes for a particular original stride are not in the BLANK state, method 500 returns to operation 502 to restart the method 500 and possibly choose a different original stride to move.

In operation 514, the state of the original and target strides are updated after the move is performed to reflect their updated states, such as in the transition bitmap or some other suitable tracking mechanism known in the art. The original stride may be updated to be in the BLANK state when data is not stored therein any longer, while the target strides may be updated to be in the NEW state when they are filled with migrated data.

The method 500 may include an additional operation where the state of each target stripe is determined prior to ending. This check may determine whether all target stripes are in the NEW state, which indicates that the original data has been migrated to the new location.

During the transition of the original array to the distributed array, the data storage system still needs to be able to respond to user I/O, in a simultaneous fashion. To the user, the data storage system remains with the same redundancy and RAID layout until the transition is complete in one embodiment. In this embodiment, when a Read request is received for data in the original array prior to complete migration/transformation, the read request is split or divided into a plurality of sub-I/O, with each sub-I/O corresponding to a unique stripe within the original array. Then, the transition bitmap is used to determine a corresponding state for each unique stripe within the original array which is associated with a sub-I/O.

In accordance with this embodiment, when the state for an unique stripe is OLD, the sub-I/O is satisfied with data from the original stripe at position (ax,ay) of the traditional array. Furthermore, when the state for an unique stripe is BLANK or NEW, data is read from the corresponding stripe (sx,sy) in the distributed array.

For a write request, the bitmap is consulted to determine the state of the original stride. When the state of the original stride is BLANK or NEW, data from the original stride has already been moved, so the write request is performed at the corresponding stripe (sx,sy) in the distributed array according to one embodiment. Furthermore, when the state of the original stride is OLD, the state of corresponding target strides that this stride will be moved to are checked in the bitmap. Note that typically there will be more than one target stride involved with the original stride (and at most two target strides, in one embodiment). If all the target strides are in the BLANK state, a full stride write may be performed, so that after the full stride write, the target stride has been updated with the new write data from the write request; if not, the write request is performed on the various original stripes of the traditional array.

Information for the locations of the original and target stripes and strides may be found by consulting the transition bitmap, in each of these embodiments.

When a rebuild is requested, the stripe to rebuild may be inside or outside the traditional array. When the rebuild stripe is inside of the traditional array, the state of the corresponding target stride maybe checked. When the rebuild stripe is outside of the traditional array, the bitmap is set so that M(ay)=1, treating this location like the old data has been moved out. In this way, the state may still be determined for the rebuilding stride. When the state of the rebuild stripe is OLD, the rebuild is performed on the traditional array without any changes, as would be understood by one of skill in the art. When the state of the rebuild stripe is BLANK, no rebuild is needed and the request is dropped and indicated as having been executed successfully, in one embodiment. When the state of the rebuild stripe is NEW, the rebuild is performed on the rebuild stripe since the stripe has been migrated and is now in the distributed array.

In the case of some interrupt or upset during a data migration/transformation, such as during a stride move operation, it is desired that the process may be resumed once the interrupt is cleared. The interrupt may be due to any reason, such as adapter reset, power loss, etc. Accordingly, during the data migration/transformation process to maintain data integration, in one embodiment, data in transition, and particularly the whole stride data, may be stored to non-volatile memory, such as NVRAM, Flash memory, etc. When the interrupt is resumed, the stored data may be written to the target stride to complete the move.

After the transition from the traditional array to the distributed array is completed, all the stripes are in the distributed array layout, so the transition bitmap is no longer needed and may be written over, deleted, etc.

Figure 6:
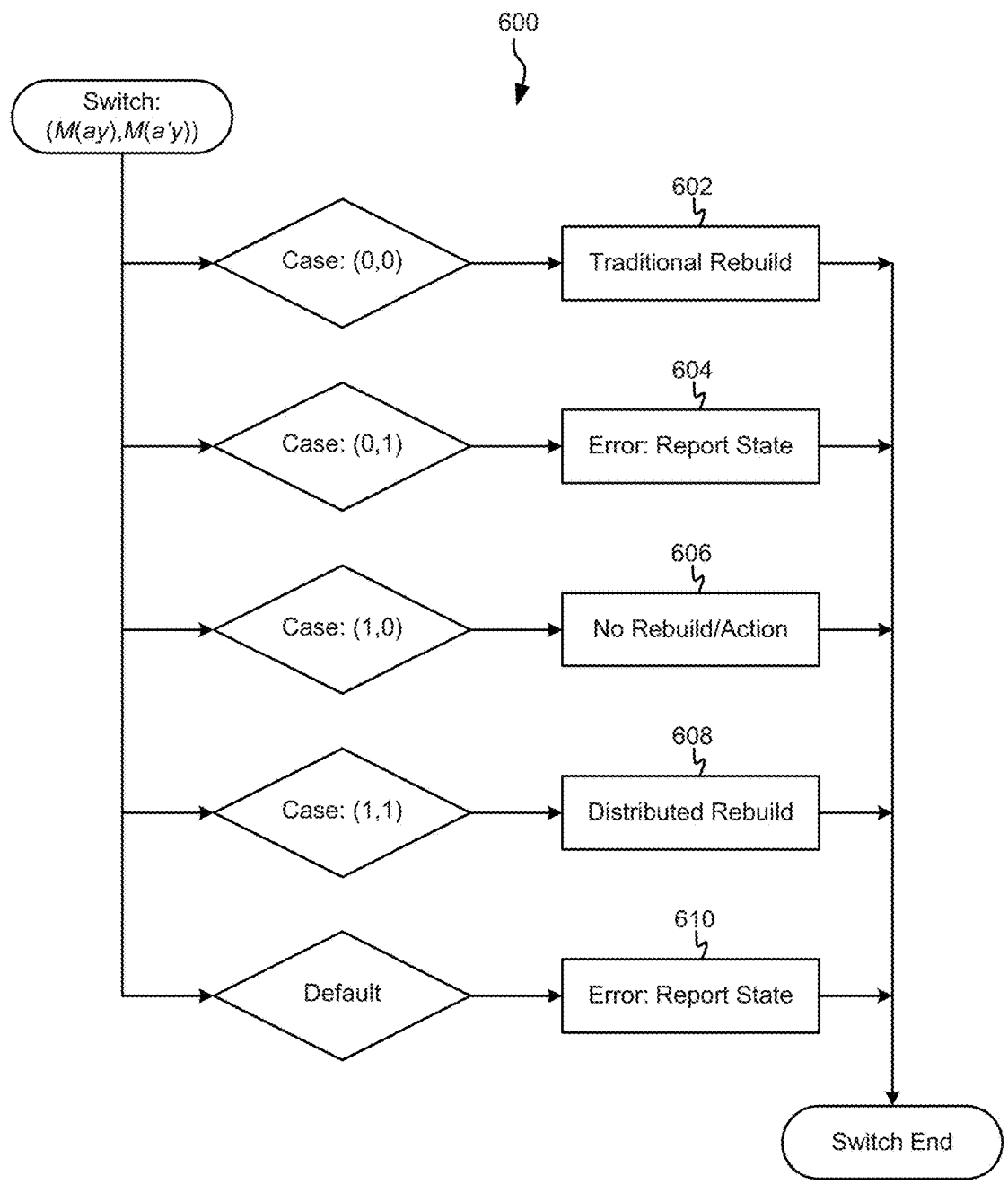
FIG. 6 shows a switch mechanism for responding to particular states during a rebuild, according to one embodiment.

Now referring to FIG. 6, a simple switch mechanism 600 is shown for responding to particular states during a rebuild, according to one embodiment. The switch mechanism 600 may respond to any of the various states associated with strides in the original and distributed arrays. In one embodiment, the switch mechanism 600 may have as inputs the two dimensional transition bitmap, indicated as (M(ay),M(a'y)).

For Case (0,0) which indicates a state of OLD, a traditional rebuild may be performed in operation 602 on the original stride at the location indicated in the original array, as would normally be done and known in the art.

For Case (0,1) which indicates a state of INV, an error state is reported in operation 604 and the rebuild is indicated as having failed.

For Case (1,0) which indicates a state of BLANK, a rebuild is not performed in operation 606 because the stride is empty and no data is stored thereto.

For Case (1,1) which indicates NEW, a distributed rebuild is performed in operation 608 on the target stride at the location indicated in the distributed array.

A default case may also be defined, with an error state being reported in operation 610 and the rebuild being indicated as having failed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program: etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for migrating data to a distributed array, the computer program product comprising a computer readable storage medium having program instructions embodied therewith, the program instructions readable and/or executable by a processor to cause the processor to:

iteratively select, by the processor, an original, unmoved stride from an original array until all original strides have been moved;
 determine, by the processor, a target stride location in a distributed array:
 determine, by the processor, a state of the target stride, the state being chosen from: an old state indicating unmoved data is stored therein, a blank state indicating no data is stored therein, and a new state indicating that migrated data is stored therein:
 determine, by the processor, whether all target stripes of the target stride are in the blank state;
 move, by the processor, data from the original stride to the target stripes in the target stride when all the target stripes of the target stride are in the blank state;
 delay, by the processor, the moving of the data from the original stride to the target stripes in the target stride when any of the target stripes of the target stride are in the old state and waiting until all the target stripes of the target stride are in the blank state; and
 determine, by the processor, that all original strides from the original array have been moved.

2. The computer program product as recited in claim 1, wherein the program instructions are further readable and/or executable by the processor to construct, by the processor, a two-dimensional transition bitmap configured to store information regarding a state of each stride in storage media used by the original array and the distributed array for storage of data thereto.

3. The computer program product as recited in claim 2, wherein the transition bitmap comprises a set of two-bit values representing the state of each stride in the storage media used by the original array and the distributed array.

4. The computer program product as recited in claim 3, wherein the transition bitmap is used for determining the state of the target stride, determining that all original strides from the original array have been moved, and determining whether all target stripes of the target stride are in the blank state.

5. The computer program product as recited in claim 1, wherein the program instructions are further readable and/or executable by the processor to:
 update, by the processor, the state of the target stride to new after the moving;
 determine, by the processor, whether the state of all target strides are new; and
 indicate, by the processor, an error when the states of all the target strides are not new.

6. The computer program product as recited in claim 1, wherein the program instructions are further readable and/or executable by the processor to:
 receive, by the processor, a user I/O request;
 determine, by the processor, whether the I/O request is for reading data or for writing data;
 for a read request:
  divide, by the processor, the read request into a plurality of sub-I/O, each sub-I/O corresponding to a unique stripe within the original array;
  determine, by the processor, a state for each unique stripe within the original array which is associated with one of the plurality of sub-I/O;
  satisfy, by the processor, a sub-I/O with data from a corresponding original stripe of the original array when the state for an unique stripe is old;

satisfy, by the processor, a sub-I/O with data from a corresponding target stripe of the distributed array when the state for an unique stripe is blank or new; and for a write request:
determine, by the processor, a state of the original stride;
satisfy, by the processor, the write request by writing data to a corresponding stripe in the distributed array when the state of the original stride is blank or new;
satisfy, by the processor, the write request by writing data using a full stride write to one or more corresponding target strides of the distributed array when the state of the original stride is old and the state of the one or more corresponding target strides is blank; and
satisfy, by the processor, the write request by writing data to one or more corresponding original strides of the original array when the state of the original stride is old and the state of the one or more corresponding target strides is not blank.

7. The computer program product as recited in claim 1, wherein the program instructions are further readable and/or executable by the processor to:
receive, by the processor, a request to rebuild a stripe;
determine, by the processor, whether the stripe to rebuild is inside or outside of the original array;
determine, by the processor, a state of a corresponding target stride of the distributed array when the stripe to rebuild is inside of the original array;
determine, by the processor, a state of a stride containing the stripe to rebuild;
perform, by the processor, the rebuild on the stride to be rebuilt in the original array when the state of the stride to be rebuilt is old;
perform, by the processor, the rebuild on the target stride when the state of the stride to be rebuilt is new; and
refrain from performing, by the processor, the rebuild when the state of the stride to be rebuilt is blank.

8. The computer program product as recited in claim 1, wherein the program instructions are further readable and/or executable by the processor to:
store, by the processor, the data from the original stride to non-volatile memory prior to moving the data from the original stride to the target stripes in the target stride;
determine, by the processor, that an interrupt or an upset has occurred during the moving; and
write, by the processor, the data from the non-volatile memory to the target stripes in the target stride after the interrupt is resumed or the upset is ended.

9. A system, comprising:
a processor and logic integrated with and/or executable by the processor, the logic being configured to:
iteratively select an original, unmoved stride from an original array until all original strides have been moved;
determine a target stride location in a distributed array;
determine a state of the target stride, the state being chosen from: an old state indicating unmoved data is stored therein, a blank state indicating no data is stored therein, and a new state indicating that migrated data is stored therein;
determine whether all target stripes of the target stride are in the blank state;
move data from the original stride to the target stripes in the target stride when all the target stripes of the target stride are in the blank state;
delay the moving of the data from the original stride to the target stripes in the target stride when any of the target stripes of the target stride are in the old state and waiting until all the target stripes of the target stride are in the blank state; and
determine that all original strides from the original array have been moved.

10. The system as recited in claim 9, wherein the logic is further configured to construct a two-dimensional transition bitmap configured to store information regarding a state of each stride in storage media used by the original array and the distributed array for storage of data thereto.

11. The system as recited in claim 10, wherein the transition bitmap comprises a set of two-bit values representing the state of each stride in the storage media used by the original array and the distributed array.

12. The system as recited in claim 11, wherein the transition bitmap is used for determining the state of the target stride, determining that all original strides from the original array have been moved, and determining whether all target stripes of the target stride are in the blank state.

13. The system as recited in claim 9, wherein the logic is further configured to:
update the state of the target stride to new after the moving;
determine whether the state of all target strides are new; and
indicate an error when the states of all the target strides are not new.

14. The system as recited in claim 9, wherein the logic is further configured to:
receive a user I/O request;
determine whether the I/O request is for reading data or for writing data;
for a read request:
divide the read request into a plurality of sub-I/O, each sub-I/O corresponding to a unique stripe within the original array;
determine a state for each unique stripe within the original array which is associated with one of the plurality of sub-I/O;
satisfy a sub-I/O with data from a corresponding original stripe of the original array when the state for an unique stripe is old;
satisfy a sub-I/O with data from a corresponding target stripe of the distributed array when the state for an unique stripe is blank or new; and
for a write request:
determine a state of the original stride;
satisfy the write request by writing data to a corresponding stripe in the distributed array when the state of the original stride is blank or new;
satisfy the write request by writing data using a full stride write to one or more corresponding target strides of the distributed array when the state of the original stride is old and the state of the one or more corresponding target strides is blank; and
satisfy the write request by writing data to one or more corresponding original strides of the original array when the state of the original stride is old and the state of the one or more corresponding target strides is not blank.

15. The system as recited in claim 9, wherein the logic is further configured to:
receive a request to rebuild a stripe;
determine whether the stripe to rebuild is inside or outside of the original array;

determine a state of a corresponding target stride of the distributed array when the stripe to rebuild is inside of the original array;

determine a state of a stride containing the stripe to rebuild;

perform the rebuild on the stride to be rebuilt in the original array when the state of the stride to be rebuilt is old;

perform the rebuild on the target stride when the state of the stride to be rebuilt is new; and refrain from performing the rebuild when the state of the stride to be rebuilt is blank.

16. The system as recited in claim 9, wherein the logic is further configured to:

store the data from the original stride to non-volatile memory prior to moving the data from the original stride to the target stripes in the target stride;

determine that an interrupt or an upset has occurred during the moving; and write the data from the non-volatile memory to the target stripes in the target stride after the interrupt is resumed or the upset is ended.

17. A method for migrating data to a distributed array, the method comprising:

iteratively selecting an original, unmoved stride from an original array until all original strides have been moved;

determining a target stride location in a distributed array;

determining a state of the target stride, the state being chosen from: an old state indicating unmoved data is stored therein, a blank state indicating no data is stored therein, and a new state indicating that migrated data is stored therein;

determining whether all target stripes of the target stride are in the blank state;

moving data from the original stride to the target stripes in the target stride when all the target stripes of the target stride are in the blank state;

delaying the moving of the data from the original stride to the target stripes in the target stride when any of the target stripes of the target stride are in the old state and waiting until all the target stripes of the target stride are in the blank state; and determining that all original strides from the original array have been moved.

18. The method as recited in claim 17, further comprising constructing a two-dimensional transition bitmap configured to store information regarding a state of each stride in storage media used by the original array and the distributed array for storage of data thereto, wherein the transition bitmap comprises a set of two-bit values representing the state of each stride in the storage media used by the original array and the distributed array, and wherein the transition bitmap is used for the determining the state of the target stride, the determining that all original strides from the original array have been moved, and the determining whether all target stripes of the target stride are in the blank state.

19. The method as recited in claim 18, further comprising:

updating the state of the target stride to new after the moving;

determining whether the state of all target strides are new; and indicating an error when the states of all the target strides are not new.

20. The method as recited in claim 17, further comprising:

receiving a user I/O request;

determining whether the I/O request is for reading data or for writing data;

for a read request:
dividing the read request into a plurality of sub-I/O, each sub-I/O corresponding to a unique stripe within the original array;

determining a state for each unique stripe within the original array which is associated with one of the plurality of sub-I/O;

satisfy a sub-I/O with data from a corresponding original stripe of the original array when the state for an unique stripe is old;

satisfy a sub-I/O with data from a corresponding target stripe of the distributed array when the state for an unique stripe is blank or new; and for a write request:
determining a state of the original stride;

satisfy the write request by writing data to a corresponding stripe in the distributed array when the state of the original stride is blank or new;

satisfy the write request by writing data using a full stride write to one or more corresponding target strides of the distributed array when the state of the original stride is old and the state of the one or more corresponding target strides is blank; and satisfy the write request by writing data to one or more corresponding original strides of the original array when the state of the original stride is old and the state of the one or more corresponding target strides is not blank.

* * * * *